March 6, 1934.  F. SLUSHER  1,950,196
METHOD OF MANUFACTURING DECORATED SHEET MATERIAL
Filed Jan. 9, 1933
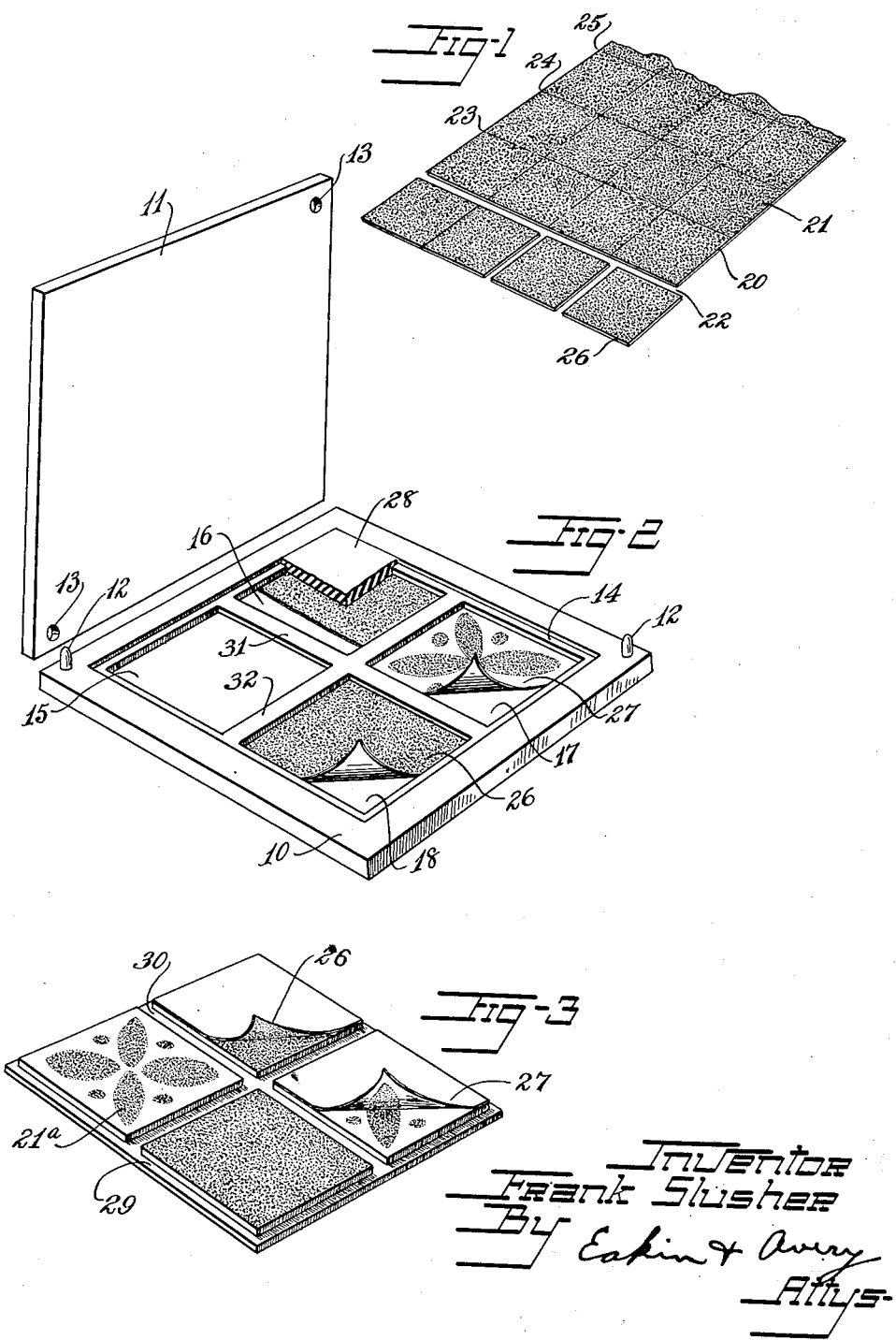
Inventor
Frank Slusher
By Eakin & Avery
Attys.

Patented Mar. 6, 1934

1,950,196

UNITED STATES PATENT OFFICE 1,950,196

METHOD OF MANUFACTURING DECORATED SHEET MATERIAL

Frank Slusher, Akron, Ohio, assignor to The B. F. Goodrich Company, New York, N. Y., a corporation of New York Application January 9, 1933, Serial No. 650,759

6 Claims. (Cl. 41—33)

This invention relates to methods of manufacturing decorated sheet material such as floor and wall coverings comprising vulcanized rubber.

The principal objects of the invention are to provide accuracy and efficiency in procedure and to produce an attractive article in imitation of tile.

Other objects will appear from the following description and the accompanying drawing.

In the drawing:

Fig. 1 is a perspective view of a transfer sheet of inextensible material carrying a design element, showing the sheet as partly separated into sections.

Fig. 2 is a perspective view of a mold showing sections of the transfer sheet bearing designs partly in place therein and also showing part of a sheet of plastic backing applied thereto.

Fig. 3 is a perspective view of the finished decorated material with the inextensible transfer sections partly removed therefrom.

Referring to the drawing, in practicing the invention I provide a mold for holding the design elements in proper relation in forming the article, said mold comprising a recessed bottom plate 10 and a cover plate 11 which may be aligned therewith by means of dowel pins 12 and corresponding dowel holes 13. Plate 10 is formed to provide a main cavity 14 having the shape and area of the desired decorated sheet. The bottom of the cavity 14 is additionally recessed to provide a plurality of design-element locating sub-cavities 15, 16, 17, 18 separated by channel-forming partitions 31, 32 of any desired configuration, those shown in the drawing being parallel to the sides of the cavity 14 and equally spaced therefrom.

One or more transfer sheets 20 of inextensible nonadhesive material, such as paper, holland cloth, or other material is provided with a removable deposit of rubber from solutions or dispersions of colored rubber compound in one or more colors either by spraying, printing, painting, or dipping. Where blocks of mottled or speckled material are desired this conveniently may be accomplished by spraying one or more colors of rubber dispersion over the surface of the sheet and allowing the deposited material to dry thereon. By the use of a stencil the spraying may be confined to certain areas such as the area 21a of the sheet.

The sheet material 20 bearing the removable rubber design material 21 may now be accurately cut as along lines 22, 23, 24 and 25 to provide strips of the material which may be recut to provide sections 26 having the shape and size of certain of the sub-cavities 16, 18. Other similar sheet material having the same design in other colors, or of different design may be similarly divided to provide contrasting blocks or sections 27 to fit other sub-cavities 15, 17 of the mold.

The decorated sections are placed in the molds in the desired arrangement with their decorated faces toward the cavity 14 where they may be inspected as to arrangement and for faulty workmanship before being combined in the finished article, to prevent waste of material through errors in arrangement or the use of imperfect design elements.

A sheet of plastic material 28, such as unvulcanized rubber compound, having a volume slightly in excess of the cavity 14 and the unfilled portions of cavities 15, 16, 17 and 18, is now laid in cavity 14 and the cover plate 11 is placed thereon. The mold is now subjected to heat and pressure, as between the heated platens of a hydraulic press, to unite the deposited rubber to the plastic material and vulcanize the same while molding the plastic material to provide exposed stripes of the plastic material between the design sections.

The vulcanized sheet of material 29 is now removed from the mold and the inextensible sheet material 20 removed therefrom. The deposited rubber design is integrally united to the backing material in the desired arrangement and provides an inlaid design having decided wearing properties.

Where the sub-cavities 15, 16, 17, and 18 are made slightly deeper than the sheet material 20 the partitions 31 and 32 form grooves or channels 30 between the design elements which give the finished article the appearance of tile. Where the backing material is made of a color contrasting with the material of the deposits, the backing material, being exposed at these channels, simulates the appearance of cement between the tiles.

While the design elements have been represented as squares, it will be apparent that they may be of any desired shape, number and arrangement, to provide the desired design, it being possible by this method to produce complicated designs simulating mosaic tile work.

I claim:

1. The method of making a decorated sheet of material which comprises forming decorative rubber designs on inextensible, removable transfer sheets, arranging the sheets in a mold according to a predetermined arrangement, superimposing an unvulcanized backing layer of plastic composition thereon, and uniting the designs and backing by heat and pressure.

2. The method of making a decorated sheet of material which comprises forming decorative rubber designs on an inextensible removable transfer sheet, dividing the inextensible sheet into sections, arranging the sections so formed in a mold in spaced relation to each other, superimposing an unvulcanized backing layer of plastic composition thereon, and uniting the designs and backing by heat and pressure.

3. The method of making a decorated sheet of material which comprises forming decorative rubber designs on transfer sheet material, arranging sections of the transfer material in a mold in spaced relation to each other, superimposing a backing layer of plastic composition thereon, and uniting the plastic composition and the designs while molding channels therebetween under the influence of heat and pressure.

4. The method of making a decorated sheet of material which comprises spraying a rubber deposit upon transfer sheet material, arranging sections of the transfer material in spaced relation in a mold, superimposing thereon a plastic backing, and uniting the deposit to the backing by heat and pressure.

5. The method of making a decorated sheet of material which comprises spraying a rubber deposit upon transfer sheet material, arranging sections of the transfer material in a mold with different sections similarly formed to provide an ornamental design, applying a plastic backing thereto, and uniting the deposits to the backing by heat and pressure.

6. The method of making a decorated sheet of material which comprises spraying a rubber deposit upon a removable inextensible transfer sheet, dividing the sheet and its deposit to form design sections, arranging the sections in a mold in spaced relation to each other, applying a backing of plastic material thereto, and uniting the designs and the backing by heat and pressure while molding the plastic material to form channels between the sections.

FRANK SLUSHER.